Nov. 10, 1964 W. O. HARNISH 3,156,353

CLOSURE

Filed March 4, 1963

INVENTOR
WAYNE O. HARNISH
BY
Carpenter, Abbott, Coulter & Kinney
ATTORNEYS

United States Patent Office 3,156,353

Patented Nov. 10, 1964

3,156,353
CLOSURE

Wayne O. Harnish, St. Paul, Minn., assignor to Minnesota Mining and Manufacturing Company, St. Paul, Minn., a corporation of Delaware Filed Mar. 4, 1963, Ser. No. 262,651
11 Claims. (Cl. 206—52)

This invention is particularly concerned with a new device for storing reels of magnetic recording tape. The novel storage device includes the reel itself, using the circular side flanges of the reel, in combination with a flexible band closure member wrapped coaxially around the reel. The closure member by itself is also believed to be novel.

The common procedure of storing reels of magnetic recording tape in the box in which they were purchased is not completely satisfactory. Cardboard boxes soon are worn and unsightly, and the tape sometimes becomes loose and tangled in the box. Cardboard dust rubbed from the box may contaminate the tape. In the storage of video recording tape and data processing tape, dust is an especially serious problem. Plastic bags or other dustproof enclosures have heretofore been used for storage of such tape and are generally considered to be a necessary nuisance.

The dust problem is solved in a specific embodiment of the present invention by using a reel with a continuous hub rim and solid flanges and a flexible band wrapped coaxially around the reel covering the space between the flange edges. The two ends of the band telescope when wrapped on the reel and are provided with special means for latching with a ratcheting action to permit adjustment of the circumference of the wrapped band. The ratcheting provides a snug, essentially dustproof fit allowing for variations in flange circumference. The novel band is attractive, used conveniently and quickly, easily labeled, and may be provided with external legs permitting upright storing of reels.

In general, the novel closure member comprises a flexible band, preferably molded from a tough flexible plastic such as polypropylene. The two ends of the band are provided with latching means including a lever mounted on a fulcrum on one end of the band, a portion of the lever overlapping and contacting the outer surface at the other end of the band. Cooperating detent means such as circumferentially spaced ratchet teeth formed in the contacting surfaces hold the band closed but permit adjustment of the circumference of the wrapped band. Preferably the lever and fulcrum are molded integrally with the band.

The latching means include means for retaining the cooperating detent means in engagement. In one arrangement a thin flexible web, molded integrally with the rest of the band, links the lever with the band. The web joins the band at a position further removed from the end of the band than is the fulcrum and biases the lever to retain the detent means in engagement.

The present invention will be readily understood from the following description of a preferred embodiment in conjunction with the accompanying drawings in which.

Figures 1, 2:
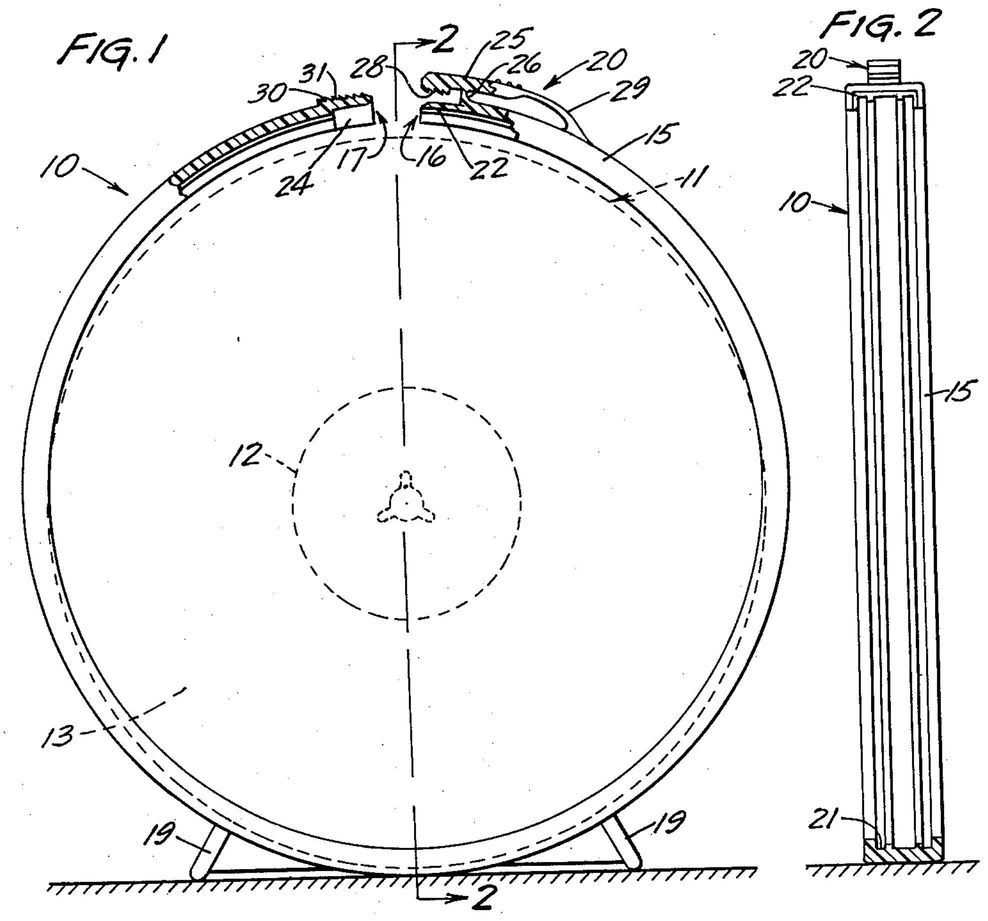
FIGURE 1 is a side elevation, partially in central section, of a band closure in combination with a magnetic recording tape reel in the practice of this invention.
FIGURE 2 is taken along the lines 2—2 of FIGURE 1, with the reel removed.
Figure 3:
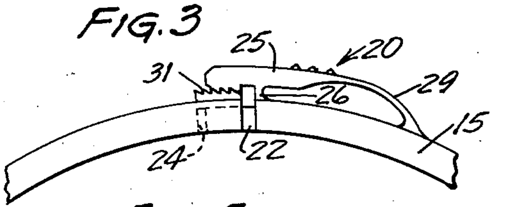
FIGURE 3 is a fragmentary side elevation of the band closure of FIGURE 1 in latched position.
Figure 4:
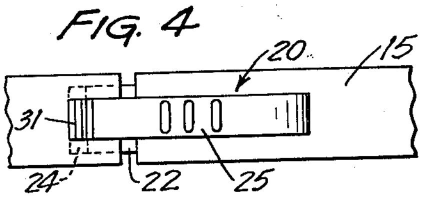
FIGURE 4 is a fragmentary top view of the band closure of FIGURE 1 in latched position.

FIGURE 1 pictures an unlacthed closure member 10 fitted around a reel 11, the reel being shown in phantom line and having a continuous hub rim 12 and two solid circular side flanges 13. The closure member 10 includes a circular band 15 of molded plastic. Molded integrally with the band are legs 19 and a latch, generally designated 20, with a cooperating part on each band end 16 and 17.

As seen in FIGURE 2, the band 15 is formed with circumferential grooves 21 on its radially inner surface in which the edges of the reel flanges 13 fit. A tongue 22 protrudes from the band end 16 and is adapted to telescope in a corresponding recess 24 in the band end 17. When the band is latched tightly around the reel 11, tape carried by the reel is protected from dust.

The latch 20 on the band is designed to permit adjustment in the length of the wrapped band circumference and accommodates reels of slightly different circumference. The latch 20 includes a lever 25 and fulcrum 26 molded integrally with the end of the band 16. The portion of the lever 25 which extends over the tongue 22 is formed with a set of circumferentially spaced ratchet teeth 28. The other portion of the lever tapers to a thin web 29 which extends in an arch to the band and serves as a return spring tending to hold the lever 25 against rotational movement from the position illustrated. A platform 30 with a second set of ratchet teeth 31 is molded on the radially outer surface of the band end 17, with the teeth raised sufficiently to mesh with those on the lever 25 when the band ends are together, and the lever held in its normal position by web 29. The two sets of ratchet teeth are oriented with respect to each other so as to permit shortening the band circumference by sliding the lever teeth 28 over the platform teeth 31, but to prevent lengthening the band circumference without raising the lever 25 to disengage the ratchet teeth.

Since in the illustrated construction the latch 20 and band 15 are molded integrally, the lever's rotation requires the fulcrum 26 to flex in hinge-like action, the thin web 29 necessarily flexing at the same time. For this construction plastics capable of long flexible life are required. One plastic that has proved durable is isotactic polypropylene. At the central points, the fulcrum is narrowed to a thickness in the plane of the bending axis of about 10–50 mils (preferably 20–30 mils), and the piece is preferably caused to be flexed at that point while still warm from the molding operation. Apparently this produces a degree of molecular orientation that greatly enhances the strength and durability of the hinge. The narrowed central portion should have a limited height (preferably 30–60 mils) aproximately twice the thickness, tapering to a relatively thick base. Alternatively, the narrowed point where flexing occurs could be right at the band, with the fulcrum tapering upwardly to a relatively thick upper portion.

The web 29 may be about 30–70 mils (preferably 40–50 mils) in thickness substantially over its length. As with the fulcrum, immediately after molding while the plastic is still warm, the lever 25 is pressed downward, causing flexing at the point 32. The molecular orientation which is apparently thus produced provides a strong, durable hinge at the point 32, even though the thickness at that point is no less than over the rest of the web 29.

Figure 5:
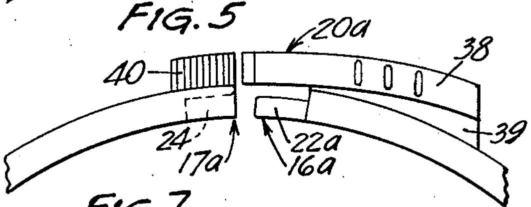
FIGURES 5 and 6 are fragmentary views of another band closure embodying this invention, FIGURE 5 being a side elevation showing the band closure unlatched and FIGURE 6 a top view showing the band closure latched.
Figure 6:
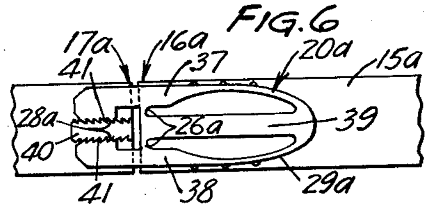
Figure 7:
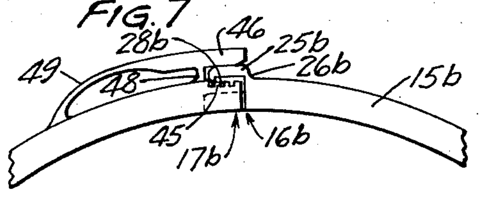
FIGURE 7 is a fragmentary side elevation of a further band closure of this invention.

Other designs for the band or latch will occur to those skilled in the art, examples being illustrated in FIGURES 5–7. FIGURES 5 and 6 picture the adjacent ends **16*a* and 17*a* of a wrapped band 15*a* and a latch 20*a*** having cooperating parts on the two band ends. On band end 16a two spaced, opposed levers 37 and 38 are attached on opposite sides of an upstanding, central flange 39 at fulcrums 26a and end of webs 29a, portions of the two levers comprising jaws that open when the levers are pressed inward and rotated by flexing the fulcrums. The jaw portions of the levers extend over a tongue 22a on the end 16a of the band and have facing surfaces formed with sets of ratchet teeth 28a. A post 40 on the other band end 17a is adapted to fit between, and in contact with, the spaced surfaces of the levers when the band ends are together, with ratchet teeth 41 on opposite sides of the post interlocking with the ratchet teeth 28a on the levers to hold the band ends together.

In a second alternative design, shown in FIGURE 7, a band 15b has a lever 25b and fulcrum 26b molded on end 16b. The lever 25b overlaps the band end 17b and has a depending ratchet tooth 28b that cooperates with teeth 45 on the band end. Preferably molded in the position it assumes when disengaged from the teeth 45, the lever 25b is partially overlapped and normally held in the locking position by a second lever 46 that is attached to band end 17b by a fulcrum 48 and biased against lever 25b by a web 49. When the lever 46 is pressed open, the lever 25b is permitted to spring away and the band ends spread apart.

I claim:

1. In combination, a reel having a hub and two spaced parallel circular side flanges, and a reel closure member comprising a flexible band wrapped coaxially around the reel bridging the space between the flange edges, the wrapped band having two adjoining ends provided with latching means adapted to be molded integrally with the flexible band and including a lever and fulcrum on one end of the band, the lever overlapping the other end of the band, cooperating detent means on the radially inner surface of the overlapping portion of said lever and on the radially outer surface of said other end of the band, the detent means on at least one of said surfaces comprising a series of circumferentially spaced detents to permit adjustment of the circumference of the wrapped band, means for retaining said cooperating detent means in engagement, and means for pivoting the lever about the fulcrum to disengage the detent means and permit removal of the band from the reel.

2. In combination, a reel having a hub and two spaced parallel circular side flanges, and a reel closure member comprising a flexible band wrapped coaxially around the reel bridging the space between the flange edges, the wrapped band having two adjoining ends provided with latching means adapted to be molded integrally with the flexible band and including a lever and fulcrum on one end of the band, the lever overlapping the other end of the band, cooperating detent means on the radially inner surface of the overlapping portion of said lever and on the radially outer surface of said other end of the band, the detent means on at least one of said surfaces comprising a series of circumferentially spaced detents to permit adjustment of the circumference of the wrapped band, and a thin flexible web linking the lever with the band at a position further removed from the end of the band than is the fulcrum, the web biasing the lever to retain the cooperating means in engagement.

3. In combination, a reel having a hub and two spaced parallel circular side flanges, and a reel closure member comprising a flexible band wrapped coaxially around the reel flanges bridging the space between the flange edges, the wrapped band having two adjoining ends provided with latching means adapted to be molded integrally with the flexible band and including a lever and fulcrum on one end of the band, the lever overlapping the other end of the band, cooperating detent means on the radially inner surface of the overlapping portion of said lever and on the radially outer surface of the other end of the band, the detent means on said radially outer surface comprising a series of circumferentially spaced ratchet teeth to permit adjustment of the circumference of the wrapped band, means for retaining said cooperating detent means in engagement, and means for pivoting the lever about the fulcrum to disengage the detent means and permit removal of the band from the reel, said ratchet teeth being oriented with respect to the cooperating detent means to permit shortening the band circumference by sliding the lever over the teeth, but to prevent lengthening the band circumference without disengagement of the detent means.

4. In combination, a reel having a hub and two spaced parallel circular side flanges, and a reel closure member comprising a flexible band wrapped coaxially around the reel bridging the space between the flange edges, the wrapped band having two adjoining ends provided with latching means adapted to be molded integrally with the flexible band and including a lever and fulcrum on one end of the band, one end of the lever overlapping the other end of the band, interlocking means on said one end of the lever and on the overlapped portion of said other end of the band for latching the band ends together in one position of the lever, and a thin flexible web linking the lever with the band at a position further removed from the end of the band than is the fulcrum, the web biasing the lever into the latching position.

5. In combination, a reel having a hub and two spaced parallel circular side flanges, and a reel closure member comprising a flexible molded plastic band wrapped coaxially around the reel bridging the space between the flange edges, the wrapped band having two adjoining ends provided with latching means including a lever and fulcrum integrally molded on one end of the band, one end of the lever overlapping the other end of the band, interlocking means on said one end of the lever and on the overlapped portion of said other end of the band for latching the band ends together in one position of the lever, and a thin molded flexible web integrally linking the lever with the band at a position further removed from the end of the band than is the fulcrum.

6. In combination, a reel having a hub and two spaced parallel circular side flanges, and a reel closure member comprising a flexible molded polypropylene band, wrapped coaxially around the reel bridging the space between the flange edges, the wrapped band having two adjoining ends and latching means including a lever and fulcrum integrally molded on one end of the band, the fulcrum being narrowed over a short length to a thickness in the range between 10 and 50 mils, one end of the lever overlapping the other end of the band, interlocking means on said one end of the lever and on the overlapped portion of said other end of the band for latching the band ends together in one position of the lever, and a thin molded flexible web integrally linking the lever with the band at a position further removed from the end of the band than is the fulcrum.

7. A closure member for use with a reel having a hub and two spaced parallel circular side flanges comprising a flexible band adapted to be wrapped coaxially around the reel flanges with the two ends of the band adjoining and the band bridging the space between the flange edges, and latching means adapted to be molded integrally with the flexible band including a lever and fulcrum on one end of the band, one end of the lever overlapping the other end of the band when the band is wrapped on the reel, interlocking means on said one end of the lever and on the overlapped portion of said other end of the band for latching the band ends together in one position of the lever, and a thin flexible web linking the lever with the band at a position further removed from the end of the band than is the fulcrum, the web biasing the lever into the latching position.

8. A closure member for use with a reel having a hub and two spaced parallel circular side flanges comprising a flexible band adapted to be wrapped coaxially around the reel flanges with the two ends of the band adjoining and the band bridging the space between the flange edges, and latching means adapted to be molded integrally with the flexible band including a lever and fulcrum on one end of the band, one end of the lever overlapping the other end of the band when the band is wrapped on the reel, cooperating detent means on the radially inner surface of said lever and on the radially outer surface of the other end of the band, the detent means on at least one of said surfaces comprising a series of circumferentially spaced detents to permit adjustment of the circumference of the wrapped band, means for retaining said cooperating detent means in engagement, and means for pivoting the lever about the fulcrum to disengage the detent means and permit removal of the band from the reel.

9. A dust resistant reel-closure combination including a reel having a hub with a continuous rim and two spaced parallel circular solid side flanges, and a reel closure member comprising a flexible band wrapped coaxially around the reel bridging the space between the flanges edges and having circumferential grooves on its radially inner surface adapted to receive the flange edges, the wrapped band having two adjoining ends, one end reduced in size to form a circumferentially extending tongue bridging the space between the flange edges and telescoped in a corresponding recess in the other band end, the radially inner surface of the tongue being grooved to receive the flange edges, and latching means adapted to be molded integrally with the flexible band including a lever and fulcrum on one of said band ends, one end of the lever overlapping the second of said band ends when the band is wrapped on the reel, interlocking means on said one end of the lever and on the overlapped portion of said second band end for latching the band ends together in one position of the lever, and a thin flexible web linking the lever with the band at a position further removed from the end of the band than is the fulcrum, the web biasing the lever into latching position.

10. A dust resistant reel-closure combination including a reel having a hub with a continuous rim and two spaced parallel circular solid side flanges, and a reel closure member comprising a flexible band wrapped coaxially around the reel bridging the space between the flange edges and having circumferential grooves on its radially inner surface adapted to receive the flange edges, the wrapped band having two adjoining ends, one end reduced in size to form a circumferentially extending tongue bridging the space between the flange edges and telescoped in a corresponding recess in the other band end, the radially inner surface of the tongue being grooved to receive the flange edges, and latching means adapted to be molded integrally with the flexible band including a lever and fulcrum on one of said band ends, the lever overlapping the second of said band ends, cooperating detent means on the radially inner surface of the overlapping portion of said lever and on the radially outer surface of said second band end, the detent means on said radially outer surface comprising a series of circumferentially spaced ratchet teeth to permit adjustment of the circumference of the wrapped band, means for retaining said cooperating detent means in engagement, and means for pivoting the lever about the fulcrum to disengage the detent means and permit removal of the band from the reel, the ratchet teeth being oriented to permit shortening the reel circumference by sliding the lever over the teeth, but to prevent lengthening the reel circumference without dis-engagement of the detent means.

11. In combination, a reel having a hub with a continuous rim and two spaced parallel circular solid side flanges, and a reel closure member comprising a flexible band wrapped coaxially around the reel bridging the space between the flange edges, the wrapped band having two adjoining ends, one end reduced in size to form a circumferentially extending tongue bridging the space between the flange edges and telescoped in a corresponding recess in the other band end, and latching means adapted to be molded integrally with the flexible band including a lever and fulcrum on one of said band ends, the lever overlapping the second of said band ends, cooperating detent means on the radially inner surface of the overlapping portion of said lever and on the radially outer surface of said second band end, the detent means on at least one of said surfaces comprising a series of circumferentially spaced detents to permit adjustment of the circumference of the wrapped band, means normally biasing the detent surface of the lever against said radially outer surface, and means for pivoting the lever about the fulcrum to disengage the detent means and permit removal of the band from the reel.

References Cited in the file of this patent

UNITED STATES PATENTS

| | | |
|---|---|---|
| 1,461,029 | Doty | July 10, 1923 |
| 1,717,104 | Goldsmith | June 11, 1929 |
| 1,840,425 | Andrews | Jan. 12, 1932 |
| 2,191,849 | Debrie | Feb. 27, 1940 |
| 2,330,278 | Gordon | Sept. 28, 1943 |
| 2,425,841 | Scott | Aug. 19, 1947 |
| 2,461,201 | Ellis | Feb. 8, 1949 |
| 2,507,680 | Rheude | May 16, 1950 |
| 2,822,919 | Kulka | Feb. 11, 1958 |
| 2,842,262 | Wismer | July 8, 1958 |